United States Patent [19]
Wojnar et al.

[11] 3,930,005
[45] Dec. 30, 1975

[54] ANTIINFLAMMATORY AGENTS AND THEIR USE

[75] Inventors: Robert John Wojnar, East Windsor; Russell James Brittain, Pennington; Jack Bernstein; Kathryn Alice Losee, both of New Brunswick, all of N.J.

[73] Assignee: E. R. Squibb & Sons, Inc., Princeton, N.J.

[22] Filed: June 15, 1973

[21] Appl. No.: 370,487

[52] U.S. Cl. ............... 424/253; 260/252; 260/254

[51] Int. Cl.² ........................................ A61K 31/52
[58] Field of Search ............ 424/253; 260/252, 254

Primary Examiner—Jerome D. Goldberg
Attorney, Agent, or Firm—Lawrence S. Levinson; Merle J. Smith

[57] ABSTRACT

9-Benzyladenine and certain derivatives have been found to possess antiinflammatory properties and compositions containing these compounds are useful in treating conditions of inflammatory origin.

12 Claims, No Drawings

ANTIINFLAMMATORY AGENTS AND THEIR USE

SUMMARY OF THE INVENTION

9-Benzyladenine and certain derivatives thereof, some of which are new compounds, have been found to possess antiinflammatory properties. This invention therefore relates to certain new 9-benzyladenine derivatives, to compositions containing the particular group of compounds comprising 9-benzyladenine and certain derivatives and to a method for treating various inflammatory conditions.

The compounds with which this invention is concerned are those having the formula

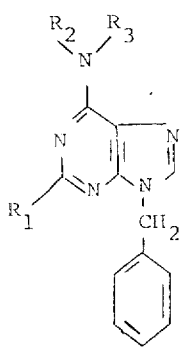

(I)

wherein $R_1$ is hydrogen, halogen, lower alkyl, lower alkoxy, amino, lower alkylamino or di-lower alkylamino; and $R_2$ and $R_3$ each is hydrogen or lower alkyl.

The new members of this group which are antiinflammatory agents are compounds of formula I wherein $R_1$ is chlorine, lower alkyl, lower alkoxy, lower alkylamino or di-lower alkylamino and each of the other symbols have the same meaning as above.

Preferred members of formula I are those wherein $R_1$ is hydrogen, amino, chlorine, lower alkyl, particularly methyl, and lower alkoxy, particularly methoxy; $R_2$ and $R_3$ each is hydrogen, lower alkyl, particularly hydrogen, methyl and ethyl, and especially $R_2$ and $R_3$ are both hydrogen. Most preferred are those wherein $R_2$ and $R_3$ each is hydrogen.

DETAILED DESCRIPTION OF THE INVENTION

The inflammatory response, which is part of the mechanism of host defense, may consist of both humoral and cellular components that result in local vasodilation, increased vascular permeability, edema and cellular infiltration. Inflammation is characterized by infiltration by polymorphonuclear leukocytes, monocytes, lymphocytes, and/or plasma cells in varying proportion, depending on the particular disease in question. These events lead to removal of the inflammatory stimulus and significant repair of tissue. If any of the responses to injury is poorly controlled, and if the inflammatory condition persists, the reaction becomes harmful to the host. Steroids are among the most potent antiinflammatory agents available. However, because of the undesirable side effects of steroidal antiinflammatory agents, current research is focused on non-steroidal agents with low incidence of side effects.

It has been found that 9-benzyladenine and certain derivatives thereof, in contrast to other 9-substituted purine derivatives like 9-phenyladenine, 9-cyclohexylmethyl adenine, etc., have useful antiinflammatory properties and compositions containing these compounds can be administered to alleviate and treat various inflammatory conditions in various warm blooded mammals. Certain of these compounds are new. The invention therefore relates to these new compounds, to compositions containing certain 9-benzyladenines and to the method for administering these compounds and compositions for the treatment of various inflammatory conditions.

The group of 9-benzyladenines which have these antiinflammatory properties are those of formula I above wherein the symbols have the meanings defined.

The lower alkyl and lower alkoxy groups referred to include those having a straight or branched hydrocarbon chain of 1 to 7 carbon atoms, particularly those having 1 to 4 carbon atoms and most especially the 1 and 2 carbon members, for example, methyl, ethyl, propyl, isopropyl, butyl, isobutyl, t-butyl, methoxy, ethoxy, butoxy, isobutoxy, etc. The halogens include the four common halogens, particularly chlorine and bromine and especially chlorine.

A preferred group of compounds which are particularly useful in the treatment of inflammatory conditions have been described above.

9-Benzyladenine and its derivatives of formula I are antiinflammatory agents which are useful in compositions for alleviating both acute and chronic conditions. A favorable response is achieved in inflammatory conditions of the delayed hypersensitivity, cell-mediated immunity type, as well as those of the immune complex type. Compositions containing compounds of formula I can be used systemically for alleviation of the symptoms of rheumatoid arthritis, particularly in the chronic phases. They can also be used topically to reduce local inflammatory conditions including allergic eczematous contact dermatitis, poison ivy or chemical contact dermatitis, for example.

Recent studies have also indicated that cell-mediated immunity is involved in disease processes such as homo-and allo-graft rejection (organ and tissue transplantation), certain auto-immune disorders (allergic encephalomyelitis, allergic neuritis, uveitis and multiple sclerosis), inflammatory bowel disease (ulcerative colitis) and recurrent aphthous stomatitis and thus response to treatment by means of the compositions herein is suggested.

These compositions can be used in various warm blooded, mammalian species such as guinea pigs, rabbits, mice, rats and the like.

In general, an effective amount of the active substance, e.g., on a basis of about 1 to 50 mg./kg./day, is incorporated in a composition along with an organic or inorganic solid or liquid carrier or excipient appropriate for the particular mode of administration, oral, parenteral or topical. Thus the compositions may take the form of tablets, capsules, ointments or creams, or in liquid form, solutions, suspensions or emulsions. For these various forms the essentially physiologically inert substances include the appropriate one or more of the following: water, gelatin, lactose, starch, stearyl alcohol, propylene glycol, cetyl alcohol, magnesium stearate, myristyl stearate, isopropyl palmitate, isopropyl myristate and other fatty acid esters, talc, vegetable oils, gums, benzyl alcohols, petrolatum, polyalkylene glycols, vinyl polymers, mineral oil, polyalkylene resins, carboxymethyl cellulose and derivatives, as well as preservatives, stabilizing agents, wetting or emulsifying agents, buffers, etc., all according to accepted pharmaceutical practice. In general, about 10 to 500 mg. of active substance per unit of dosage is present.

For systemic use a dosage providing about 1 to 50 mg./kg. per day, preferably 1 to 15 mg./kg., in two to four divided doses is formulated. The active substance may be administered in dosage forms such as tablets, capsules, solutions or suspensions containing about 10 to 500 mg., preferably 25 to 100 mg., per unit of dosage of a compound or mixture of compounds of formula I compounded with a physioligically acceptable vehicle or carrier, excipient, binder, preservative, stabilizer, flavor, etc. For example, a capsule is formulated containing about 100 mg. of active substance along with magnesium stearate and lactose. The same ingredients can be compressed into a tablet. An oil suspension is prepared utilizing finely divided active material suspended in a vegetable oil such sesame oil or corn oil along with minor amounts of preservative and antioxidant.

For parenteral administration, e.g., for subcutaneous, intramuscular or intraarticular administration, an injectable composition is formed by dissolving or suspending about 25 to 200 mg., preferably 50 to 150 mg., per ml. of active substance in a sterile vehicle for injection, e.g., water for injection or a physiologically acceptable natural vegetable oil like sesame oil, peanut oil, corn oil or the like, or a synthetic vehicle like ethyl oleate. Preservatives, like benzyl alcohol, antioxidants, like butylated hydroxyanisole or butylated hydroxytoluene, surface active agents, like Tween 80, thickening agents like aluminum monostearate, etc., are included as required.

For topical use, a formulation is prepared containing about 0.1 to 10 percent, preferably 1 to 5 percent by weight of active substance in a lotion, cream or ointment for application to the affected area two to four times daily. Such compositions are formulated, for example, by admixing the active substance in a oil-in-water emulsion, e.g., one formed from glyceryl monostearate, cetyl alcohol, myristyl stearate, isopropyl palmitate and propylene glycol or other glycol, or in an anhydrous cream formed, for example, from propylene glycol, cetyl alcohol and polyethylene glycol 6000.

Additional illustrative details as to the compositions are provided in the examples.

As previously indicated, compounds having the formula (II)

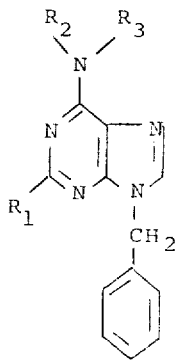

wherein $R_1$ is chlorine, lower alkyl, lower alkylamino, di-lower alkylamino, lower alkoxy and $R_2$ and $R_3$ each is hydrogen or lower alkyl are new. They as well as the other compounds of formula I can be synthesized by two basic alternative approaches. The purine ring may be preformed and then benzylated to obtain the appropriate 9-benzylpurine or precursor thereto. Alternatively, a 6-benzylaminopyrimidine, with appropriate substituents in the 2-, 4- and 5-positions, may be ring closed to give the desired 9-benzyl substituted purine.

The first method comprises benzylating a compound or the formula (III)

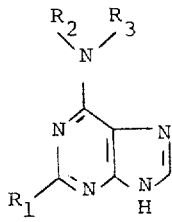

with a compound of the formula (IV)

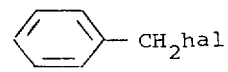

wherein hal is halogen, preferably chlorine, in an inert organic solvent such as dimethylacetamide, dimethyl formamide, dimethylsulfoxide or the like, in the presence of a proton acceptor like potassium carbonate or sodium carbonate, or the like, preferably at an elevated temperature in the range of about 100° to 110°C.

A mixture of 9- and 7-isomers is generally obtained by this direct benzylation. Fractional crystallization from a medium such as ethanol or acetonitrile readily separates the isomers. When $R_1$ is other than hydrogen, the 9-position is more readily benzylated than the 7-position.

Compounds of the formula III, in which $R_1$ is alkoxy are synthesized by reaction of a compound of formula III in which $R_1$ is halogen with a metal derivative of a lower alkanol, such as sodium methoxide or potassium ethoxide in an inert solvent such as toluene at elevated temperatures, preferably, the boiling temperature of toluene.

An alternative synthesis, especially when $R_2$ and/or $R_3$ is other than hydrogen, is to benzylate a 6-chloropurine of the formula (V)

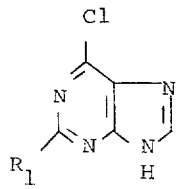

according to *J. Am. Chem. Soc.* 83, 633 (1961), to obtain a product of the formula (VI)

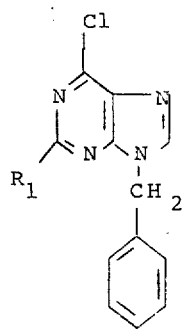

and then replace the chlorine by reaction of the compound of formula VI with an amine

according to J. Am. Chem. Soc. 83, 630 (1961).

According to the second approach, 9-benzyl adenines can also be synthesized by ring closure of the appropriately substituted pyrimidine following the general method of *J. Org. Chem.* 21, 178 (1956), by reacting a pyrimidine of the formula (VII)

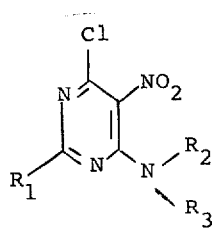

with benzyl amine in boiling butanol or ether at room temperature, followed by reduction of the nitro group to obtain an intermediate of the formula (VIII)

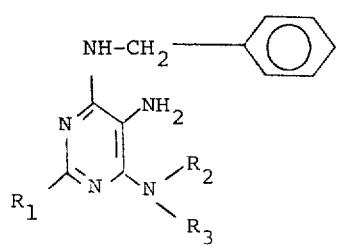

which is then heated with formamide to obtain a product of the formula (X)

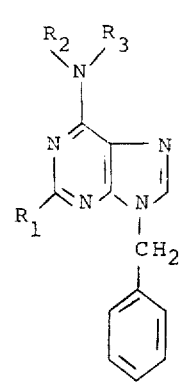

The inhibitory effects of compounds of formula I have been compared with other purine derivatives in guinea pigs by a modification of the delayed hypersensitivity skin reaction technique of David et al., *J. Immunol.* 93, 264 (1964). The compound under test is administered at 50 mg./kg. subcutaneously in sesame oil one half hour before and 5 hours after the challenge of the animal by the antigen, tuberculin (purified protein derivative). Reactions are measured 24 hours post challenge by antigen. A compound having a value less than 75% inhibition of the thickness of the lesion is considered not active enough for practical purposes.

The following tables show the results of the treatment of guinea pigs according to this method with various purine derivatives having the indicated structure.

TABLE I

9-Benzyl Substituted Adenines and the Delayed Hypersensitivity

Skin Reaction (Tuberculin)

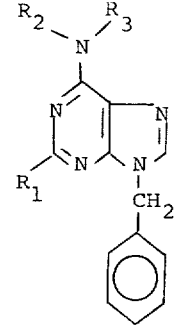

| Compound | $R_1$ | $R_2$ | $R_3$ | % Inhibition[a] Diameter | Thickness |
|---|---|---|---|---|---|
| 1 | H | H | H | 23 | 77 (22)[b] |
| 2 | $NH_2$ | H | H | 52 | 98 (17) |
| 3 | Cl | H | H | 46 | 98 (5) |
| 4 | $CH_3$ | H | H | 44 | 100 (7) |
| 5 | $OCH_3$ | H | H | 47 | 98 (5) |
| 6 | H | $C_2H_5$ | H | 36 | 83 (14) |
| 7 | H | $CH_3$ | $CH_3$ | 24 | 75 (9) |

[a]The values are the average inhibition of the measured parameter in animals treated with the test compound, as compared to animals treated with vehicle.
[b]Number of animals tested.

TABLE II

9-Substituted Adenines and the Delayed Hypersensitivity

Skin Reaction (Tuberculin)

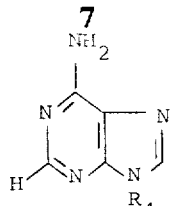

| Compound | R₄ | % Inhibition Diameter | Thickness |
|---|---|---|---|
| 8 | p-chlorobenzyl | 14 | 48 (13)* |
| 9 | p-methoxybenzyl | 9 | 11 (8) |
| 10 | cyclohexylmethyl | 10 | 21 (6) |
| 11 | cyclohexyl | 24 | 49 (3) |
| 12 | phenyl | 5 | 4 (12) |
| 13 | phenethyl | 11 | 13 (7) |
| 14 | furfuryl | 10 | 40 (18) |
| 15 | tetrahydro-2-furyl | 11 | 29 (3) |
| 16 | 1-adamantyl | 3 | 11 (12) |

TABLE III

9-Benzyl Substituted Purines and the Delayed Hypersensitivity

Skin Reaction (Tuberculin)

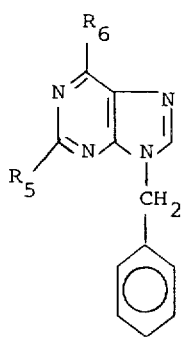

| Compound | R₅ | R₆ | % Inhibition Diameter | Thickness |
|---|---|---|---|---|
| 17 | NH₂ | OH | 10 | 45 (8)* |
| 18 | H | NHNH₂ | 17 | 15 (3) |
| 19 | H | Cl | 0 | 0 (3) |

The 9-benzyladenines in Table I show average thickness inhibition values in the range 75 to 100%. The other 9-substituted adenines in Table II and other 9-benzylpurines in Table III show average thickness inhibition values less than 50% indicating the high activity of the first group in contrast to no activity or activity not of practical value in the other two groups.

The following examples are illustrative of the invention. Temperatures are on the centigrade scale.

EXAMPLE 1

9.4 g. of 2-chloroadenine are mixed with 13.9 g. of benzyl chloride and 7.6 g. of anhydrous potassium carbonate in 250 ml. of dimethylacetamide.

The mixture is heated at 110° for 24 hours with stirring. The solid is filtered off and the filtrate is concentrated to a viscous residue under reduced pressure. About 100 ml. of alcohol are added. A clear solution forms; then soon a light yellow crystalline solid precipitates. This is filtered to yield 11.2 g. of 9-benzyl-2-chloroadenine melting at 158°–160°. Recrystallization from acetonitrile does not alter the melting point.

EXAMPLE 2

A solution of 2.59 g. of 9-benzyl-2-chloroadenine and 3.24 g. (0.06M) of sodium methoxide in 400 ml. of methanol is refluxed for 1 hour. The methanol is distilled off and replaced with 400 ml. of toluene. The resulting suspension is refluxed with stirring (110°) for 2 days. The solid is then filtered, washed well with ether and suspended in 200 ml. of water. After stirring at room temperature for one hour, the solid is filtered and dried to yield 2.2 g. of crude 9-benzyl-2-methoxyadenine. After recrystallization from 100 ml. of absolute alcohol, the product is constant melting at 242°–244°.

EXAMPLE 3

4 g. of 6-amino-2-methylpurine, sulfate, sesquihydrate, are suspended in 50 ml. of hot water and the suspension is made alkaline with excess concentrated aqueous ammonia. After standing several hours, the solid is filtered, washed free of sulfate with water and dried at 140° and 1 mm for 48 hours to obtain 2.3 g. of 2-methyladenine (m.p.>300°).

2.25 g. of 2-methyladenine, 3.8 g. of benzyl chloride and 2.07 g. of anhydrous potassium carbonate are mixed in 75 ml. of dimethylacetamide. The mixture is heated with stirring at about 110° for 24 hours. The solid is filtered off and the solvent is concentrated until crystallization occurs. The residue is triturated with alcohol to yield 2.2 g. of 9-benzyl-2-methyladenine melting at 227°–230°. After recrystallization from 100 ml. of alcohol, the compound melts at 228°–230°.

EXAMPLE 4

Following the procedure of Example 1, but substituting an equivalent amount of 2-methylaminoadenine for the 2-chloroadenine, there is obtained the desired 7-benzyl-2-methylaminoadenine.

EXAMPLE 5

Following the procedure of Example 1, but substituting an equivalent amount of 2-n-butylaminoadenine for the 2-chloroadenine, there is obtained 9-benzyl-2-n-butyladenine.

EXAMPLE 6

Following the procedure of Example 1, but substituting an equivalent amount of 2,N⁶,N⁶-trimethyladenine for the 2-chloroadenine, there is obtained 9-benzyl-2,N⁶,N⁶-trimethyladenine.

EXAMPLE 7

Following the procedure of Example 1, but substituting an equivalent amount of 2-amino-N⁶-methyladenine for the 2-chloroadenine, there is obtained 2-amino-9-benzyl-N⁶-methyladenine.

EXAMPLE 8

Following the procedure of Example 1, but substituting an equivalent amount of 2-dimethylamino-N⁶-methyladenine for the 2-chloroadenine, there is obtained 9-benzyl-2-dimethylamino-N⁶-methyladenine.

EXAMPLE 9

Following the procedure of Example 1, but substituting an equivalent amount of 2-dimethylamino-N⁶,N⁶-dimethyladenine for the 2-chloroadenine there is obtained 9-benzyl-2-dimethylamino-$N^6,N^6$-dimethyladenine.

EXAMPLE 10

Following the procedure of Example 1, but substituting an equivalent amount of 2-methylamino-$N^6$-methyladenine for the 2-chloroadenine, there is obtained 9-benzyl-2-methylamino-$N^6$-methyladenine.

EXAMPLE 11

Following the procedure of Example 1, but substituting an equivalent amount of 2-methylamino-$N^6$, $N^6$-dimethyladenine for the 2-chloroadenine, there is obtained 9-benzyl-2-methylamo-$N^6,N^6$-dimethyladenine.

EXAMPLE 12

Following the procedure of Example 1, but substituting an equivalent amount of 2-chloro-$N^6,N^6$-diethyladenine for the 2-chloroadenine, there is obtained 9-benzyl-2-chloro-$N^6,N^6$-diethyladenine.

EXAMPLE 13

Following the procedure of Example 2, but substituting an equivalent amount of 9-benzyl-2-chloro-$N^6,N^6$-diethyladenine for the 9-benzyl-2-chloroadenine, there is obtained 9-benzyl-2-methoxy-$N^6,N^6$-diethyladenine.

EXAMPLE 14

Following the procedure of Example 1, but substituting an equivalent amount of 2-chloro-$N^6$-methyladenine for the 2-chloroadenine there is obtained 9-benzyl-2-chloro-$N^6$-methyladenine.

EXAMPLE 15

Following the procedure of Example 2, but substituting an equivalent amount of 9-benzyl-2-chloro-$N^6$-methyladenine for the 9-benzyl-2-chloroadenine, there is obtained 9-benzyl-2-methoxy-$N^6$-methyladenine.

EXAMPLE 16

Following the procedure of Example 1, but substituting an equivalent amount of sodium ethoxide for the sodium methoxide and replacing the methanol with ethanol, there is obtained 9-benzyl-2-ethoxyadenine.

EXAMPLE 17

Following the procedure of Example 3, but substituting an equivalent amount of 2-ethyladenine for the 2-methyladenine, there is obtained 9-benzyl-2-ethyladenine.

EXAMPLE 18

Following the procedure of Example 3, but substituting an equivalent amount of 2,$N^6$-dimethyladenine for the 2-methyladenine, there is obtained 9-benzyl-2,$N^6$-dimethyladenine.

EXAMPLE 19 a. A solution of 11.5 g. of benzylamine in 60 ml. of anhydrous ether is added to a suspension of 8.7 g. of 4-amino-6-chloro-5-nitropyrimidine in 450 ml. of anhydrous ether. The reaction mixture is stirred overnight at room temperature and is then filtered. The solid is suspended in 300 ml. of water, stirred at room temperature for 2 hours and then filtered. The residue is extracted with about 300 ml. of boiling ethanol and is then crystallized from aqueous dimethylformamide.

The product, 4-amino-6-benzylamino-5-nitro pyrimidine melts at about 201°–203°.

b. To a suspension of 9.7 g. of 4-amino-6-benzylamino-5-nitropyrimidine in 500 ml. of boiling water there is added, in small portions, 48 gms. of sodium dithionate. When the addition is completed (about 30 minutes), the reaction mixture is filtered to remove a small amount of insoluble material and the filtrate made strongly alkaline with concentrated aqueous ammonia. Upon cooling, the product, 4,5-diamino-6-benzylaminopyrimidine crystallizes. The solid is filtered and melts at about 150°–151°.

Alternate synthesis — To a suspension of 8.7 gms. of 4-amino-6-benzylamino-5-nitropyrimidine in 300 ml. of ethanol there is added 2.5 gms. of 5% palladium on carbon and the mixture is shaken at room temperature in an atmosphere of hydrogen at 50 psi (initial pressure). When the uptake of hydrogen is complete, an additional 200 ml. of ethanol is added and the hot mixture is filtered. To the filtrate there is added an excess of 25% sulfuric acid, and the mixture cooled. The precipitated monosulfate of 4,5-diamino-6-benzylamino-pyridine is recovered by filtration.

c. A suspension of 8.5 gms. of 4,5-diamino-6-benzylaminopyrimidine sulfate in 30 ml. of formamide is heated at 180°–190° for about 30 minutes. The slightly cooled reaction mixture is poured into 250 ml. of water. The precipitated solid is filtered, and then stirred with about 100 ml. of 2N aqueous sodium hydroxide. The mixture is filtered and the residue crystallized from aqueous ethanol, yielding 9-benzyladenine, melting at about 227°–229°.

EXAMPLE 20

An aqueous suspension is prepared from the following ingredients:

| | |
|---|---|
| 9-benzyladenine (recrystallized, sterile, micropulverized) | 50 gm. |
| Sodium carboxylmethylcellulose (sterile) | 7 gm. |
| Sodium chloride USP | 6 gm. |
| Tween 80 USP | 0.5 gm. |
| Benzyl Alcohol | 5 gm. |
| Water for injection    qs to | 1.0 liter |

The sodium chloride, benzyl alcohol and Tween 80 are dissolved in water. This solution is sterile filtered and the sodium carboxymethylcellulose is dissolved in it with agitation. The 9-benzyladenine is suspended in the vehicle with agitation. The suspension is filled into sterile vials each containing 2 ml. (50 mg./ml.) and sealed.

EXAMPLE 21

An aqueous suspension is prepared from the following:

| | |
|---|---|
| 9-benzyl-2-methyladenine (recrystallized,sterile,micronized) | 150 gm. |
| Sodium carboxymethylcellulose (sterile) | 8 gm |
| Sodium chloride USP | 7 gm. |
| Tween 80 USP | 1 gm. |
| Benzyl alcohol | 10 gm. |
| Water for injection    qs. to | 1.0 liter |

The ingredients are admixed as in Example 20 and filled into 20 ml. vials containing 150 mg./ml.

EXAMPLE 22

| | |
|---|---|
| 9-Benzyladenine (recrystallized, sterile, micropulverized) | 100 gm. |
| Aluminum monostearate (sterile) | 1 gm. |
| Benzyl alcohol | 1 gm. |
| Butylated hydroxyanisole | .02 gm. |
| Sesame oil    qs. to | 1 liter |

The benzyl alcohol and butylated hydroxyanisole are dissolved in the sesame oil and the aluminum monostearate is added with agitation. The vehicle is sterilized with ethylene oxide. The 9-benzyladenine is added and homogenized until a uniform suspension is produced. The suspension is filled into 5 ml. sterile vials and sealed.

EXAMPLE 23

A suspension containing 100 mg./ml. of 9-benzyl-2-methladenine is prepared as in Example 6 by substituting the same amount of 9-benzyl-2-methyladenine for the 9-benzyladenine and corn oil for the sesame oil.

EXAMPLE 24

10 Kg. of 9-benzyladenine are blended with lactose USP to make 30 kg. 400 Mg. of prescreened magnesium stearate are added as lubricant. The blend is encapsulated in gelatin capsules each containing 100 ml. of 9-benzyladenine.

EXAMPLE 25

5 Kg. of 9-benzyl-2-methyladenine, 350 ml. of magnesium stearate and 30 kg. of anhydrous lactose are blended. In a tablet punch, tablets are made each containing 50 mg. of 9-benzyl-2-methyladenine.

EXAMPLE 26

By substituting 10 kg. of 9-benzyladenine for the 5 kg. of 9-benzyl-2-methyladenine in Example 9, tablets each containing 100 mg. of 9-benzyladenine are produced.

EXAMPLE 27

A topical formulation containing the active substance in an oil-in-water emulsion cream base is made from the following ingredients:

| | |
|---|---|
| 9-benzyl-2-methoxyadenine (micropulverized) | 50 gm. |
| Propylene glycol | 250 ml. |
| Cream base    qs. to | 1000 gm. |

| Cream Base | |
|---|---|
| Glyceryl monostearate NF XII | 94 gm. |
| Cetyl alcohol | 22 gm. |
| Myristyl stearate | 56 gm. |
| Isopropyl palmitate | 22 gm. |
| Tween 60 | 33 gm. |
| Propylene glycol | 150 ml. |
| Aqueous buffer (pH 6-7)    qs. to | 1000 gm. |

The glyceryl monostearate, cetyl alcohol, myristyl stearate and about one third of the Tween 60 are melted in a stainless steel container at about 80°–90°. In a separate stainless steel container are added the aqueous buffer, the remainder of the Tween 60 and propylene glycol and heated to 80°–90°.

The oil phase is added to the aqueous phase at about the same temperature (80°–90°) with agitation. The emulsion is cooled to room temperature with slow agitation.

The 9-benzyl2-methoxyadenine is dispersed in the propylene glycol. This dispersion is incorporated into the cream base with gentle mixing until homogeneous.

EXAMPLE 28

An anhydrous cream containing 3% of active substance is formed from the following ingredients:

| | |
|---|---|
| 9-benzyladenine (micropulverized) | 30 gm. |
| Propylene glycol | 600 ml. |
| Cetyl alcohol | 230 gm. |
| Polyethylene glycol 6000 | 70 gm. |

The cetyl alcohol and polyethylene gylcol 6000 are melted in a glass lined container at 80°–90°. The 9-benzyladenine is dispersed in the propylene glycol with gentle warming (ca. 40°) in a similar container with agitation. The melt is combined into the propylene glycol dispersion while still fluid with rapid agitation. The temperature is reduced to room temperature with reduced agitation until a homogeneous cream is formed.

EXAMPLE 29

A gel is formed from the following ingredients:

| | |
|---|---|
| 9-benzyl-2-chloroadenine(micropulverized) | 100 gm. |
| Ethanol USP | 100 gm. |
| Carboxyvinyl polymer (Carbopol) | 20 gm. |
| Triethanolamine | 10 gm. |
| Propylene glycol | 400 gm. |
| Distilled water    qs. to | 1 liter |

The 9-benzyl-2-chloroadenine is dispersed in the ethanol in a stainless steel container at room temperature with gentle agitation. The propylene glycol and water are added and mixed well. The carboxyvinyl polymer is sprinkled on top of the mixture and allowed to hydrate with gentle agitation. The triethanolamine is then added to form the gel.

EXAMPLE 30

100 gm. of 9-benzyl-2-methyladenine in a stainless steel mixing bowl is mixed with a small amount (50 gm.) of Plastibase (plasticized hydrocarbon gel base made from 95% heavy mineral oil and 5% polyethylene resin heated to 100° and shock cooled.) Plastibase is added portionwise and blended until uniform to make 10 kg. of total product. The ointment is subdivided into 15 gm. foil dispensing tubes.

EXAMPLE 31

A lotion base is formed from the following ingredients:

| | |
|---|---|
| Cetyl alcohol | 316 gm. |
| Stearyl alcohol | 21.1 gm. |
| Span 40 | 52.6 gm. |
| Propylene glycol | 47.4 gm. |
| Tween 20 | 23.2 gm. |
| Antifoam AF emulsion | 1.05 gm. |
| Methyl paraben | 21.1 gm. |
| Propyl paraben | 2.11 gm. |
| Purified water    qs. to | 10 kg. |

In a jacketed stainless steel kettle equipped with an agitator, are added the parabens. Antifoam AF emulsion, propylene glycol and Tween 20 with sufficient water to dissolve and heated to about 80°.

In a similar kettle equipped with an agitator, the cetyl alcohol, stearyl alcohol and Span 40 are melted together at a temperature about 80° and mixed until homogeneous.

The oil phase is added to the aqueous phase at a temperature about 80° with agitation. When uniformly mixed, the lotion base mixture is transferred to a Gate-type jacketed mixed and cooled under slow agitation to about ambient temperature.

In a stainless steel mixing bowl, 500 ml. of propylene glycol are added to 100 gm. of 2-amino-9-benzyladenine and mixed until uniform. The mixture is transferred to a planetary type mixing kettle and lotion base is added to make 10 liters. This is mixed until uniform then subdivided into 10 ml. bottles.

EXAMPLE 32

100 gm. of micropulverized 9-benzyl-6-ethylaminopurine are dispersed in 40 gm. of isopropyl myristate. 50 gm. of anhydrous alcohol are added. This concentrate and propellant consisting of 90 ml. of pressurized Freon 12 and 810 ml. of pressurized Freon 114 are filled into 50 gm. aerosol cans each containing a 10% solution of active ingredient.

EXAMPLE 33

A dusting powder is formed by placing 100 gm. of micropulverized 9-benzyladenine and an equal weight of talc in a stainless steel, planetary-type mixing bowl. This is mixed until uniform. 9.8 Kg. of talc are added portionwise, mixing until uniform, to obtain a 1% dusting powder. This is subdivided into sprinkle top cans each containing 10 gm.

EXAMPLE 34

A sterile suspension for injection containing 150 mg./ml. of 9-benzyl-6-dimethylaminopurine is prepared according to the procedure of Example 21 by substituting 150 gm. of 9-benzyl-6-dimethylaminopurine for the 9-benzyl-2-methyladenine.

What is claimed is:

1. A method for treating inflammation which comprises administering to a mammal in need of said treatment a composition containing a pharmaceutical carrier and about 1 to 50 mg. per kg. of body weight of a compound of the formula

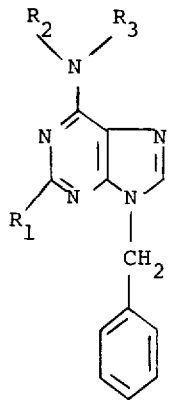

wherein $R_1$ is hydrogen, halogen, lower alkyl, lower alkoxy, amino, lower alkylamino or di-lower alkylamino, and $R_2$ and $R_3$ each is hydrogen or lower alkyl.

2. The method of claim 1 wherein in said formula $R_1$ is hydrogen, amino, chlorine, lower alkyl or lower alkoxy.

3. The method of claim 1 wherein in said formula $R_1$ is hydrogen, amino, chlorine, methyl or methoxy and $R_2$ and $R_3$ each is hydrogen, methyl or ethyl.

4. The method of claim 1 wherein in said formula $R_1$ and $R_3$ each is hydrogen and $R_2$ is ethyl.

5. The method of claim 1 wherein in said formula $R_1$ is hydrogen and $R_2$ and $R_3$ each is methyl.

6. The method of claim 1 wherein in said formula $R_2$ and $R_3$ each is hydrogen.

7. The method of claim 6 wherein $R_1$ is hydrogen.

8. The method of claim 6 wherein $R_1$ is amino.

9. The method of claim 6 wherein $R_1$ is chlorine.

10. The method of claim 6 wherein $R_1$ is methyl.

11. The method of claim 6 wherein $R_1$ is methoxy.

12. A method for treating inflammation which comprises administering to a mammal in need of said treatment orally, parenterally or topically a composition containing a pharmaceutical carrier and about 1 to 50 mg./kg. of body weight of a compound of the formula

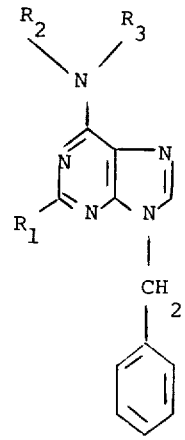

wherein $R_1$ is hydrogen, halogen, lower alkyl, lower alkoxy, amino, lower alkylamino or di-lower alkylamino, and $R_2$ and $R_3$ each is hydrogen or lower alkyl.

* * * * *